United States Patent [19]

McCloskey

[11] Patent Number: 4,674,164
[45] Date of Patent: Jun. 23, 1987

[54] BEARINGS WITH FELTED TEFLON LINERS AND METHOD FOR MAKING SAME

[75] Inventor: Albert R. McCloskey, Fairfield, Conn.

[73] Assignee: Incom International Inc., Pittsburgh, Pa.

[21] Appl. No.: 240,687

[22] Filed: Mar. 5, 1981

Related U.S. Application Data

[62] Division of Ser. No. 905,854, May 15, 1978, Pat. No. 4,277,118.

[51] Int. Cl.[4] .............................................. B23P 25/00
[52] U.S. Cl. .............................. 29/149.5 B; 29/441 R; 29/458; 384/908; 384/911; 384/912; 428/283
[58] Field of Search ............... 428/280, 281, 282, 283, 428/290; 308/DIG. 8; 29/149.5 B, 441 R, 458; 384/908, 911, 912

[56] References Cited

U.S. PATENT DOCUMENTS

| 3,365,249 | 1/1968 | McCloskey | 308/72 |
|---|---|---|---|
| 3,471,207 | 10/1969 | McCloskey | 308/72 |
| 3,528,714 | 9/1970 | McCloskey | 308/238 |
| 3,562,885 | 2/1971 | McCloskey | 29/149.5 B |
| 3,934,958 | 1/1976 | Turner | 308/238 |
| 4,079,490 | 3/1978 | McCloskey | 384/911 |

FOREIGN PATENT DOCUMENTS 1439030  6/1976  United Kingdom .

Primary Examiner—James J. Bell
Attorney, Agent, or Firm—James C. Wray

[57] ABSTRACT

A bearing has a self-lubricating liner including sheets of felted polytetrafluoroethylene fibers impregnated with cured phenolic resin having no surface bonding to the fibers. Sheets of fibrous fabric are felted to sheets of felted fibers. Sintered particles are dispersed in the low friction surface of the liner. Liners are formed by air drying resin-impregnated sheets of felted fibrous material. The resin may be cured in a heated platen press before assembly of the bearing. The bearing is assembled by deforming bearing members to form an interference fit between the members and a bearing liner disposed therebetween. Parting compound applied to one of the bearing members prevents bonding of the liner to that member when the liner is baked to cure the resin and bond the liner to the other member.

Bushes and bushings having self-lubricating linings are disclosed. Arbors and mandrels form an interference fit between the linings and bushes and bushings during assembly.

27 Claims, 14 Drawing Figures

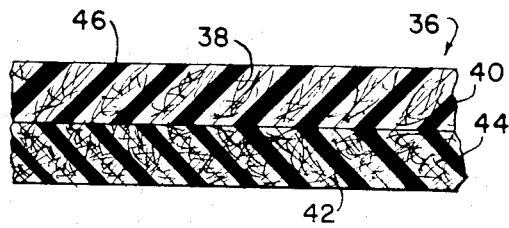
FIG. 4
FIG. 5
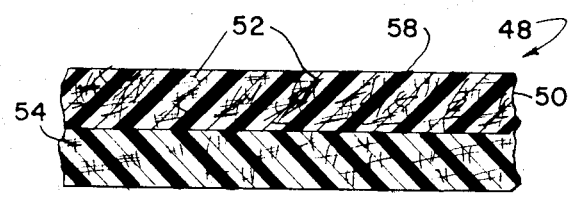
FIG. 6
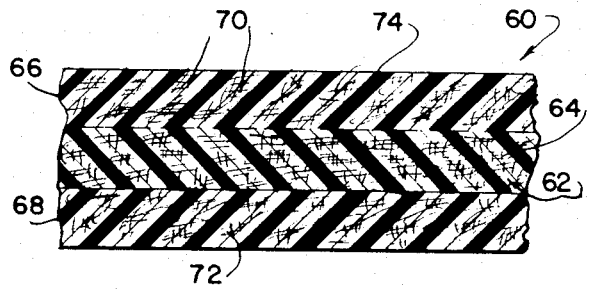

BEARINGS WITH FELTED TEFLON LINERS AND METHOD FOR MAKING SAME

This application is a division of application Ser. No. 905,854, filed 5-15-78, now U.S. Pat. No. 4,277,118.

BACKGROUND OF THE INVENTION

This invention relates generally to self-lubricating bearings and bearing liners and more particularly has reference to bearing liners containing felted fibers.

DESCRIPTION OF THE PRIOR ART

Pertinent United States and foreign patents are found in Class 29, subclass 149.5B, Class 156, subclasses 310 and 319, Class 252, subclasses 12 and 12.4, Class 264, subclasses 127 and 136, and Class 308, subclasses 72, 238, 239, 240, and Digest 8 of the Official Classifications of Patents in U.S. Pat. and Trademark Office.

Examples of pertinent patents are U.S. Pat. Nos.: 2,027,559, 2,128,087, 2,774,128, 2,804,886, 2,840,831, 2,908,028, 2,983,561, 3,186,897, 3,250,556, 3,347,737, 3,369,924, 3,533,668, 3,574,429, 3,575,787, 3,582,166, 3,629,383, 3,713,962, 3,950,599, 4,066,051, 4,031,283, 4,042,747.

No prior art bearing liners have felted fibers in combination with dry resin having no surface bonding to the felted fibers, wherein the intertangled relationship of the felted fibers within the resin mechanically entraps the felted fibers in the resin. Consequently, many problems remain in the prior art devices.

Prior art bearing liners having polytetrafluoroethylene fibers randomly dispersed in a resin matrix lack resistance to tensile forces tending to pull the fibers out of the resin matrix. Another problem which exists in prior art bearing liners using randomly dispersed or woven polytetrafluoroethylene fibers is that such liners do not have a uniform composition. The characteristics of the liners become less desirable as the liners wear. Since the polytetrafluoroethylene gathers predominantly on the bearing surface, the liners become progressively less rich in polytetrafluoroethylene as wear progresses. Still another problem lies in the prior art process of etching the polytetrafluoroethylene fibers in bearing liners. Etching increases the bondability of the fibers but detracts from the desirability of the fibers as a bearing liner material. A further problem lies in the limited utility of prior art bearings with polytetrafluoroethylene liners. These bearings are limited to applications involving heavy loading at low speed.

SUMMARY OF THE INVENTION

The present invention overcomes many of the problems which exist in the prior art devices. The present invention provides, in preferred form, a bearing having a low-friction bearing liner including felted fibers in combination with cured resin having no surface bonding to the felted fibers. The intertangled relationship of the felted fibers within the resin mechanically entraps the felted fibers in the resin and prevents tensile forces from pulling the fibers out of the resin.

Preferably, the felted fibers are felted polytetrafluoroethylene fibers. The liner is attached to a bearing member by bonding the resin to the bearing member. The bonding process has no adverse effects on the characteristics of the polytetrafluoroethylene fibers.

Felting the polytetrafluoroethylene fibers provides the liner with a substantially uniform composition. The liner is rich in polytetrafluoroethylene throughout its thickness. Liner wear does not diminish the self-lubricating properties of the bearing liner surface.

Additional fibers having high heat transfer capability and high strength characteristics can be included in the liner to improve its thermal and mechanical properties. Additionally, fibrous fabric can be felted to the felted fibers. Sintered polytetrafluoroethylene particles added to the bearing surface of the liner improve the low-friction characteristics of the liner. Pressing and heating sinters particles mechanically worked into the liner.

The bearing liners are formed by air-drying resin-impregnated sheets of felted fibrous material. The resin may be cured in a heated platen press before assembly of the bearing. the liner is then attached to the bearing by curing an additional layer of resin applied to the liner to thereby bond the liner to the bearing.

The bearing is assembled by deforming bearing members to form an interference fit between the members and a bearing liner disposed therebetween. When liners having uncured resin are used, parting compound must be applied to one of the bearing members to prevent the liner from bonding to that member. The bearing assembly is then baked to cure the resin and bond the liner to the bearing member to which no parting compound is applied.

Similar liners are disclosed for bushes and bushings. Methods for attaching these liners are also disclosed.

The bearing liners of the present invention can be used in a variety of applications. The liners perform particularly well with light loading at high speed.

Objects of the invention are, therefore, to provide an improved self-lubricating sheet of material, to provide an improved bearing liner, to provide an improved self-lubricating bearing, to provide an improved method of making self-lubricating sheets of material and bearing liners, to provide an improved method of making lined bearings, bushes and bushings, to provide a bearing liner having a uniform composition, to provide a bearing liner that is highly resistant to tensile forces tending to pull self-lubricating fibers out of the liner, and to provide a polytetrafluoroethylene bearing liner that is readily bondable to bearing members.

Another object of the invention is to provide a sheet of material having felted fibers in combination with dry resin having no surface bonding to the felted fibers, wherein the intertangled relationship of the felted fibers within the resin mechanically entraps the felted fibers in the resin.

Still another object is to provide a method for making bearings having low-friction surfaces including forming outer bearing members with inner bearing surfaces and inner bearing members with outer bearing surfaces, forming bearing liners with low-friction surfaces including adhesive resin dried to a tack-free B-stage, coating the bearing surfaces of one of the bearing members with parting compound, placing the bearing liners between the bearing surfaces of the bearing members, assembling the bearings, swaging the assembled bearings to provide an interference fit between the bearing liners and the bearing members, applying resin-curing heat to the assembled bearings, and curing the resin to thereby bond the bearing liners to the bearing members to which parting compound was not applied, the parting compound inhibiting the bond between the bearing liners and the bearing members to which the parting compound is applied.

BRIEF DESCRIPTION OF THE DRAWINGS

FIG. 4 is an enlarged sectional elevation of another embodiment of the bearing liner of the present invention.

FIG. 5 is an enlarged sectional elevation of still another embodiment of the bearing liner of the present invention including fibrous fabric.

FIG. 6 is an enlarged sectional elevation of still another embodiment of the bearing liner of the present invention including fibrous fabric.

DETAILED DESCRIPTION OF THE DRAWINGS

Figure 1:
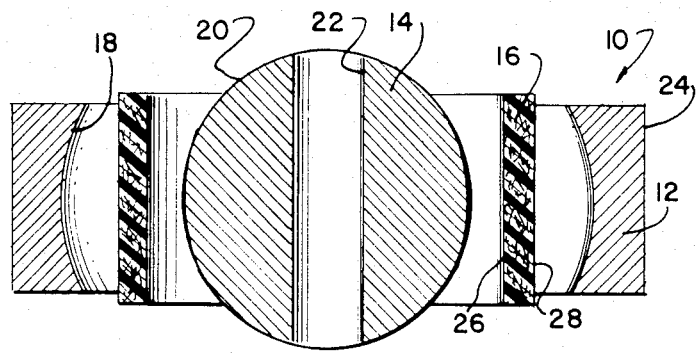
FIG. 1 shows a bearing in sectional form produced by the present method prior to assembly.

Referring to FIG. 1, there is shown a typical spherical-type bearing 10 in an unassembled state. The spherical bearing 10 comprises three parts, including an outer bearing member 12, an inner bearing member 14 and a bearing liner 16. The outer bearing member 12 is a cylindrical bearing member having a concave inner bearing surface 18. The inner bearing member 14 is a spherical bearing member having a convex outer bearing surface 20. The convex outer bearing surface 20 is curved opposite the concave inner bearing surface 18. The bearing members 12 and 14 are formed of any suitable bearing material, preferably a metallic material.

The inner bearing member 14 is provided with a central bore 22 through which typically a bolt (not shown) is placed therethrough for operationally attaching the inner bearing member 14 to an associated machine, element, apparatus, or the like (not shown). The outer bearing member 12 is typically provided with an outer cylindrical surface 24 which generally provides the assembling surface to which the outer bearing member 12 is attached to its associated machine, element, apparatus, or the like (not shown).

To enhance the bearing characteristics of the bearing 10, a bearing liner 16 is provided between the inner and outer bearing members 12 and 14 and is typically bonded or otherwise suitably attached to one of the bearing member 12 and 14. In the preferred embodiment, the bearing liner 16 is bonded to the concave inner surface 18 of the outer bearing member 12. It is appreciated that the bearing liner 16 could be bonded to the convex outer surface 20 of the inner bearing member 14 instead.

In the preferred embodiment, the bearing liner 16 has a self-lubricating bearing surface 26 that provides omnidirectional sliding contact between the inner and outer bearing members 12 and 14. The backing surface 28 of the bearing liner 16 is bonded to the concave inner surface 18 of the outer bearing member 12. Preferably, the bearing liner 16 has a uniform composition. Such composition prevents changes in the characteristics of the bearing surface 26 as the bearing liner wears.

Figure 3:
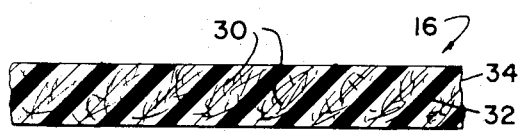
FIG. 3 is an enlarged sectional elevation of one embodiment of the bearing liner of the present invention.

One embodiment of a bearing lier 16 used in the present invention is shown in FIG. 3. The liner 16 includes felted fibers 30 in combination with synthetic resin 32. Preferably, the resin 32 impregnates sheets 34 formed of the felted fibers 30.

The felted sheets 34 are prepared by processes well known in the art. Generally, sheets are prepared by forming a non-woven batt of the fibers 30, needle punching the batt and heat-shrinking the resulting product to form a felted sheet of material 34. In an alternate process, non-woven batts of fibers are pressed and then heated to form the sheets of felted fibers. The fibers 30 are either lightly felted or thickly felted by methods well known in the art.

Preferably, the felted fibers 30 are formed of polytetrafluoroethylene. Polytetrafluoroethylene is a very slippery material and, because of this, felted sheets 34 of polytetrafluoroethylene fibers have excellent self-lubricating properties. It is appreciated, however, that the sheets 34 may be formed of various other self-lubricating fibers. Carbon fibers, for example, have been used satisfactorily in the present invention. In addition, the fibers 30 can include a mixture of self-lubricating fibers and various other fibers. For example, the polytetrafluoroethylene fibers can be mixed with fibers having higher heat transfer capabilities than polytetrafluoroethylene to improve the overall performance of the bearing liner 16 at high temperatures. Carbon fibers have such properties. Alternatively, the polytetrafluoroethylene fibers can be mixed with fibers having greater strength than polytetrafluoroethylene to improve the overall strength of the bearing liner 16. Glass, dacron and synthetic fibers are suitable high strength fibers. In addition, one or more extender fibers can be added to increase the bulk of the liner 16 and thereby reduce manufacturing costs.

As mentioned before, the sheets 34 of felted fibers 30 are impregnated with a suitable resin material 32. The resin will typically impregnate substantially the entire sheet 34 of felted fibers 30. By impregnating substantially all of the felted fibers 30, the completed bearing liner 16 has a substantially uniform composition.

The ratio of fibers 30 to resin 32 affects the properties of the bearing liner 16. As the amount of resin increases, the coefficient of friction of the liner 16 increases. On the other hand, excessive amounts of fibers adversely affect the strength and wear characteristics of the liner 16. The completed liner 16 should include at least 25% by weight of resin. Best results have been achieved with liners 16 having 55% by weight of fibers and 45% by weight of resin. The weight ratios are determined by weighing the sheet of fibers before and after it is impregnated with dry resin.

The resin 32 preferably includes a resin manufactured by H. B. Fuller, of St. Paul, Minn., designated as their Resiweld R7119. This vinyl phenolic base resin is initially in a liquid state but dries to a tack-free B-stage upon exposure to air at ambient temperature. In the B-stage, the resin remains active and can still be polymerized or cured. The liquid resin has a viscosity which enables the resin to flow and thoroughly impregnate the sheets of felted fibers at ambient conditions. After the sheet of fibers if fully impregnated, the liquid resin is dried to a tack-free B-stage. The drying process can be carried out more quickly if the resin-impregnated sheet is heated in a circulating air environment.

The resin 32 adds strength to the bearing liner 16 by mechanically locking the fibers 30 in a resin matrix 32. The fibers 30 are formed into felted sheets 34 and, because of this, the fibers 30 are intertangled in the resin matrix and resist tensile forces tending to pull the fibers 30 out of the bearing liner 16. When assembly of the spherical bearing 10 is completed, the resin 32 is cured in a manner which will be explained later. However, when polytetrafluoroethylene fibers 30 are used in the bearing liner 16 there is no chemical bonding between the fibers 30 and the resin 32. This is due to the reluctance of polytetrafluoroethylene materials to bond to other materials.

The bearing liner 16 in the present invention has numerous additional embodiments.

In the embodiment shown in FIG. 4, the bearing liner 36 has a first sheet of felted fibers 40 felted to a second sheet of felted fibers 44. The fibers 38 in the first sheet 40 and the fibers 42 in the second sheet 44 are formed of diverse materials. Any of the fiber materials or mixtures of fiber materials mentioned above are suitable. However, at least one of the sheets 40 and 44 is formed of felted polytetrafluoroethylene fibers. Preferably, the surface of the bearing liner 36 which acts as the self-lubricating bearing surface is formed of polytetrafluoroethylene fibers.

Figure 7:
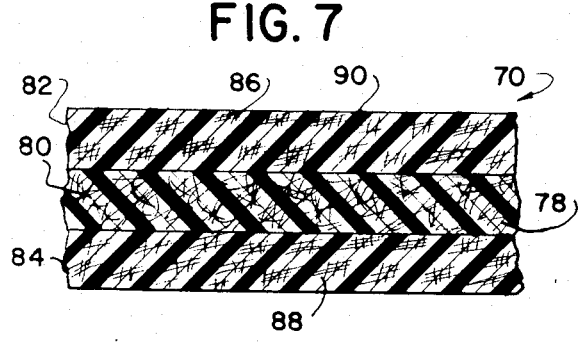
FIG. 7 is an enlarged sectional elevation of yet another embodiment of the bearing liner of the present invention including fibrous fibric.

FIGS. 5–7 illustrate an alternate embodiment of the bearing liner wherein sheets of fibrous fabric are felted to sheets of felted fibers.

The bearing liner 48, shown in FIG. 5, includes a sheet 50 of felted fibers 52 felted to a sheet 54 of fibrous fabric 56. The composite sheet is impregnated with resin 58. The sheet 54 of fibrous fabric 56 can be woven fibrous fabric, knitted fibrous fabric or non-woven fibrous fabric. The felted fibers 52 and the fabric fibers 56 are formed of self-lubricating material, preferably polytetrafluoroethylene.

In the embodiment shown in FIG. 6, the liner 60 includes a sheet 62 of fibrous fabric 64 positioned between sheets 66 and 68 of felted fibers 70 and 72 and felted thereto. Resin 74 impregnates the entire composition sheet. The liner 76, shown in FIG. 7, includes a sheet 78 of felted fibers 80 positioned between sheets 82 and 84 of fibrous fabric 86 and 88 and felted thereto. Resin 90 impregnates the entire composite sheet. In both embodiments, the felted fibers and fabric fibers are formed of self-lubricating material, preferably polytetrafluoroethylene.

Figure 8:
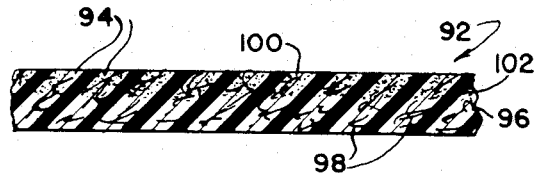
FIG. 8 is an enlarged sectional elevation of still another embodiment of the bearing liner of the present invention including sintered particles.

The bearing liner 92 shown in FIG. 8 includes sintered particles 94 dispersed in the portion of a sheet 96 of felted fibers 98 adjacent the bearing surface 100. Resin 102 impregnates the entire sheet 96 and mechanically entraps the felted fibers 98 and the sintered particles 94 in a resin matrix. The sintered particles 94 are in flaked form or powdered form. Preferably, the sintered particles 94 are sintered polytetrafluoroethylene powder particles. The felted fibers 98 are fibers formed of self-lubricating material, preferably polytetrafluoroethylene.

Alternately, any of the fiber materials or mixtures of fiber materials mentioned in the discussion of the liner 16 shown in FIG. 3 are suitable for use in the liners 48, 60 and 76 shown in FIGS. 5–7.

The properties and functions of the resin used in the liners shown in FIGS. 4–7 are similar to the properties of the resin used in the liner shown in FIG. 3. Furthermore, the ratio of fibers to resin and the uniformity of liner composition discussed in reference to the liner shown in FIG. 3 are equally applicable to the liners shown in FIGS. 4–7.

Figure 9:
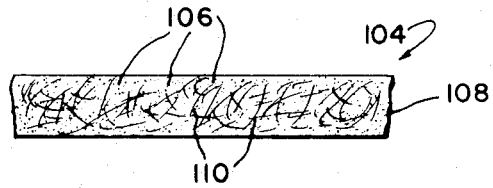
FIG. 9 is an enlarged sectional elevation of yet another embodiment of the bearing liner of the present invention including sintered particles.

The bearing liner 104 shown in FIG. 9 is a variation of the liner 92 shown in FIG. 8. Sintered particles 106 impregnate the entire sheet 108 of felted fibers 110. No resin is used. The sintered particles 106 and the felted fibers 110 are formed of self-lubricating material, preferably polytetrafluoroethylene. Alternately, any of the fiber materials or mixtures of fiber materials mentioned in the discussion of the liner 16 shown in FIG. 3 are suitable materials for the felted fibers. The sintered polytetrafluoroethylene particles 106 have no chemical bonding to the felted fibers 110. The felted fibers 110 are intertangled within the sintered particle 106 matrix and are thereby mechanically locked within the matrix. The bearing liner 104 is very flexible but has sufficient strength to resist tensile forces tending to pull the fibers 110 out of the liner 104. The liner is particularly useful in low load applications and for vibration isolation. The particles 106 are impregnated into the sheet 108 of felted fibers 110 by combining the particles 106 with the fibers 110 on one side of the sheet 108 and then working the particles 106 into the sheet 108. Alternately, the particles 106 are combined with the fibers 110 on two opposite sides of the sheet 108 and then are worked into the sheet 108 from the opposite sides simultaneously.

The sintered self-lubricating particles 94 and 106 in the bearing liners 102 and 104 shown in FIGS. 8 and 9 tend to decrease the overall coefficient of friction of the bearing liners 92 and 104. When the bearing liner 92 shown in FIG. 8 is used in the present invention, the resin 102 is cured during assembly of the spherical bearing 10. However, when the felted fibers 98 are formed of polytetrafluoroethylene materials, the curing process does not form a chemical bond between the fibers 98 and the resin 102. The fibers 98 are mechanically locked in the resin matrix in the manner described with respect to the bearing liner 16 shown in FIG. 3.

Figure 2:
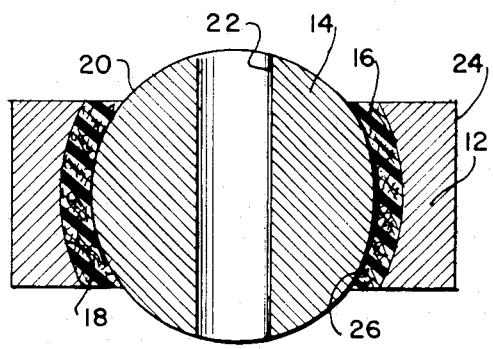
FIG. 2 shows the bearing of FIG. 1, also in sectional form, in its assembled state.

The bearing liners shown in FIGS. 3–9 are used in bearings in the manner shown in FIGS. 1 and 2. In one embodiment of the invention, the bearing liners are formed with uncured resin which is bondable to the bearing members when cured. The liner is attached to the bearing member by placing the liner in contact with the member and curing the resin. The process is more fully described later. Preferably, the bearing members are formed of a metallic material and the resin is a resin bondable to metal. Alternatively, the bearing liners are formed of a first resin which bonds to a second resin applied to the bearing liner when cured. The second resin is a resin bondable to the bearing members when cured. The process for attaching the liner to the bearing member is similar to the process just mentioned. Again, preferably the bearing members are formed of a metallic material and the resin is a resin bondable to metal. In still another embodiment of the invention, the resin in the bearing liners is cured before the bearing is assembled. The bearing liner is attached to the bearing member by either of two methods. First, a layer of adhesive material, for example, resin, is applied to the backing surface of the bearing liner. The adhesive secures the bearing liner to the desired bearing member. In the second method, a backing layer is connected to the backing surface of the bearing liner by any appropriate means. Compositions of backing layers and methods for attaching backing layers to bearing liners are well known in the art. A layer of adhesive material, for example, resin, is then applied to the surface of the backing layer adjacent the bearing member to which the bearing liner is to be attached. Preferably, the bearing members are formed of a metallic material and the resin is a resin bondable to metal. The first method is described in greater detail later. Both methods preferably use an adhesive resin identical to the resin included in the bearing liner. In both methods, the liner is attached to the bearing member by placing the adhesive surface in contact with the member and curing the resin.

If the latter method is used with the bearing liner shown in FIG. 5, the best results are achieved if the backing layer is connected to the sheet 50 of felted fibers 52 since the felted fibers can be bonded to the backing layer more easily than the fibrous fabric.

Figure 10:
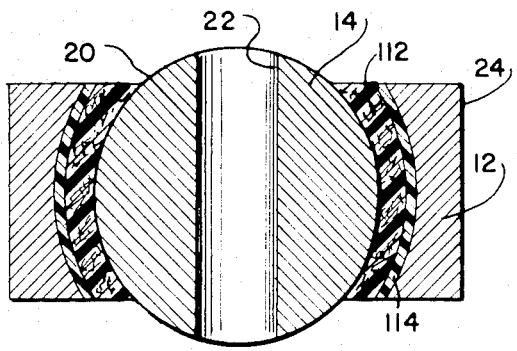
FIG. 10 shows a bearing, in sectional form, in its assembled state including a backing layer.

An assembled bearing having a bearing liner 112 with a backing member 114 is shown in FIG. 10. As previously described, the bearing liner is formed into sheets having a substantially uniform composition. The bearing surface of the bearing liner 112 remains uniform despite liner wear caused by rotation of the inner bearing member 14 across the bearing liner 112.

FIGS. 11-14 show the bearing liners of the present invention used with bushes and bushings.

Figure 11:
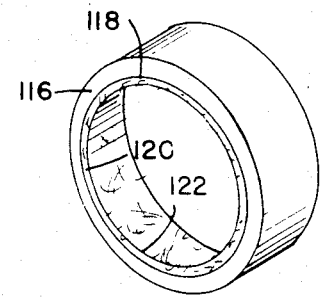
FIG. 11 is a perspective view of a bushing having a self-lubricating liner.
Figure 12:
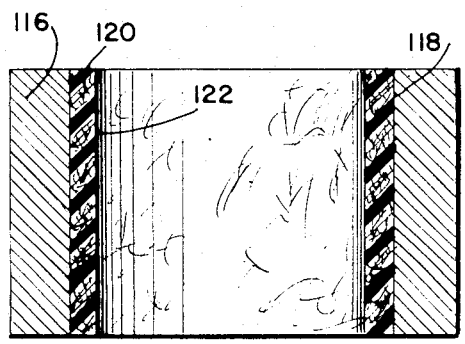
FIG. 12 is a sectional view of the bushings shown in FIG. 11.

A bushing 116 having an inner cylindrical surface 118 is shown in FIGS. 11 and 12. A bushing liner 120 connected to the inner surface 118 of the bushing 116 has a low-friction bushing surface 122 remote from the inner surface 118 of the bushing 116.

Figure 13:
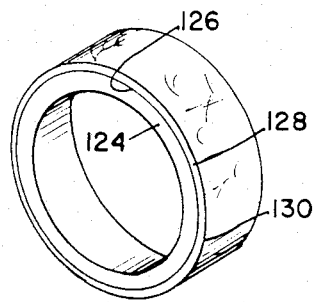
FIG. 13 is a perspective view of a bush having a self-lubricating overlay. p
Figure 14:
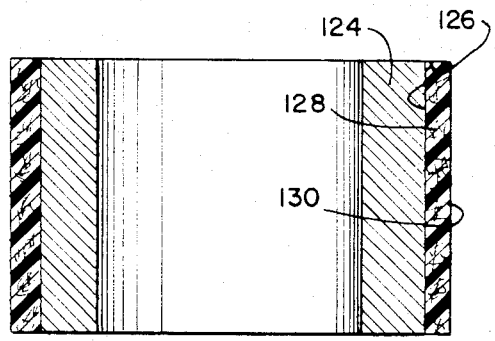
FIG. 14 is a sectional view of the bush shown in FIG. 13.

FIGS. 13 and 14 show a cylindrical bush 124 having an outer cylindrical bush surface 126. A bush liner 128 attached to the outer surface 126 of the bush 124 provides a low-friction bush surface 130 remote from the outer surface 126 of the bush 124.

It is understood that all of the embodiments of the bearing liners of the present invention shown in FIGS. 3-9 can be used with a bush or a bushing in the manner shown in FIGS. 11-14.

METHOD

The bearing liner shown in FIG. 3 is formed by applying liquid adhesive resin to a sheet of fibrous material. Preferably, the material is formed of polytetrafluoroethylene fibers. The resin is preferably applied to opposite sides of the sheet. Alternatively, the resin is applied to only one side of the sheet.

The material is thoroughly impregnated with the resin applied to the sheet either by capillary action or by calendaring. Both methods of impregnation are well-known in the art. When the resin is applied to both sides of the sheet of fibers greater uniformity of composition and evenness and thoroughness of impregnation results. The resin is selected so that impregnation can take place at ambient conditions. Impregnation is further enhanced by any of the resin curing processes described below. Once the resin is dried, it is very difficult to add additional resin by capillary action or by calendaring. Consequently, the proper amount of resin should be applied to the liner on the first coating.

After impregnation, the resin is dried to a tack-free B-stage. In the preferred method, the resin is dried by exposing the resin-impregnated material to an ambient environment. Alternatively, the resin is dried by heating the resin-impregnated material in a circulating air environment.

Generally, the method set out above can be used in making all of the various embodiments of the bearing liner of the present invention shown in FIGS. 3-8.

As previously mentioned, uncured resin in a bearing liner can be cured either during assembly of the bearing or prior to assembly of the bearing.

Prior to assembly, the resin in the bearing liner shown in FIGS. 3-8 is cured by heating and pressing the resin-impregnated material. Initially, polytetrafluoroethylene slip sheets are positioned between the resin-impregnated material and the working surfaces of platen presses. The slip sheets prevent the material from bonding to the platen presses when the resin is cured. The material is then pressed and heated by the platen presses. The required temperature and pressure for curing depends on the resin used. With the specific resin mentioned above, a temperature of about 350° F. and a pressure of about 400 to 800 psi. is required to cure the resin. This temperature and pressure is maintained for about 30 minutes. The pressing and heating of the material need not commence in any particular sequence. In one process, the platen presses are heated before pressing the material. In an alternative process, the presses apply pressure to the material and are heated while pressing. However, the prescribed temperature and pressure should co-exist for the prescribed duration.

If desired, a plurality of bearing liners can be cured simultaneously. A stack of alternating ploytetrafluoroethylene slip sheets and sheets of resin-impregnated material are placed between the working surfaces of platen presses. Slip sheets are placed adjacent the working surfaces to prevent bonding to the platen presses. The stack is heated and pressed as described above. The slip sheets positioned between the sheets of material prevent the sheets of material from bonding to each other.

The bearing shown in FIG. 9 is formed by applying loose, particulate material to the surface of a sheet of felted fibrous material. The particles are then mechanically worked into the material by any known process. Preferably, the particles are worked into substantially all the material, thereby forming a bearing liner having a uniform composition. The particles are then sintered by pressing the particle-impregnated material in a heated platen press.

The bearing liner shown in FIG. 8 is formed by a process similar to the process used to form the bearing liner shown in FIG. 9. However, the particles are worked into only a portion of the material when forming the liner shown in FIG. 8. The resin is combined with the particle-impregnated material after sintering and cured in the manner already described.

The process of forming a completed bearing is shown in FIGS. 1 and 2. As will become apparent, two separate processes are available. Both processes can use any of the various bearing liner embodiments shown in FIGS. 3-8.

One process is needed to assemble a bearing having a bearing liner with resin which is cured during assembly of the complete bearing. One advantage of not curing the liner before assembly is that the liner remains flexible and therefore can be easily manipulated to fit complex bearing shapes. Initially, inner and outer bearing members 12 and 14 are formed. A parting compound is applied to the bearing member to which the bearing liner 16 is not to be bonded. As is known, a parting compound inhibits and prevents the resin from bonding to the surface to which the compound is applied. Generally, the parting compound is a dry lubricant of the Teflon variety. Preferably, the parting compound is applied to the outer surface 20 of the inner bearing member 14. A bearing liner having uncured resin dried to a tack-free B-stage is cut to dimensions compatible with the dimensions of the surface of the bearing member to which the liner is to be attached. The liner is then coiled into a cylindrical shape and positioned between the outer bearing member 12 and the inner bearing member 14 as shown in FIG. 1. The outer bearing member 12 and/or the inner bearing member 14 are suitably deformed to bring the various bearing parts into an interference fit relationship. In the aseembled state, the bearing 10 appears as shown in FIG. 2.

Typically, the outer bearing member 12 is contracted and compressed about the inner bearing member 14 by swaging. Alternatively, the inner member 14 could be expanded within the outer bearing member 12. Additionally, both the inner bearing member 14 and the outer bearing member 12 could be deformed to form an assembled bearing 10 as shown in FIG. 2.

The assembled bearing with its respective parts in an interference fit relationship is then placed in a suitable oven or heating apparatus to bake the bearings and, more particularly, the liner disposed therein to cure the resin. Typically, the temperature would be elevated in the oven or heating apparatus to a level approximately 350°–375° F., and this level of heat would be maintained for a period of from one to three hours. After this heating period has been completed, the resin in the bearing liner 16 will be cured and will form the bond between the backing surface 28 of the liner 16 and the inner surface 18 of the outer bearing member 12. The parting compound which was applied to the convex outer surface 20 of the inner bearing member 14 will prevent the resin from bonding to said surface 20, thereby allowing the inner bearing member 14 to be rotatably supported within the bearing liner 16.

The resin becomes fluid during the curing process. This enables the liner 16 to accurately conform to the shape of the convex outer surface 20 of the inner bearing member 14. Some small degree of shrinkage of the liner 16 may be encountered during the baking or heating of the bearing which will tend to reduce the interference fit between the inner bearing member 14 and the liner 16. The desired bearing tolerance between the inner bearing member 14 and the liner 16 can be achieved by loosening the inner member 14 with respect to the liner 16. Such loosening might include impacting and/or pressure rolling the assembled bearing.

The bond between the bearing liner and the bearing member is improved by chemically cleaning the bearing surface of the bearing member before placing the bearing liner between the bearing members. The cleaning process involves sand blasting or pickling the bearing surface followed by washing, rinsing and drying. To further improve bonding, the cleaned bearing surface is immediately coated with liquid adhesive resin. The resin is dried to a tack-free B-stage before placing the bearing liner 16 between the bearing members 12 and 14. Preferably, the resin is identical to the resin included in the bearing liner. Additionally, the backing surface 28 of the bearing liner 16 may be coated with a similar resin dried to a tack-free B-stage.

Bonding is also improved by resin-coating a bearing surface that has not been cleaned or by resin-coating the backing surface of the liner without coating or cleaning the bearing surface.

The second method of assembling the bearing is used when the bearing liner contains resin which is cured prior to assembly of the bearing. The inner and outer bearing members 12 and 14 are formed as shown in FIG. 1 in the manner previously described. In addition, a bearing liner having cured resin is formed in the manner previously described. The bearing liner is cut to dimensions compatible with the dimensions of the surface of the bearing member to which the liner is to be attached. The said surface and the adjacent surface of the liner are then coated with a liquid adhesive resin that is subsequently dried to a tack-free B-stage. Preferably the bearing liner 16 is attached to the inner surface 18 of the outer bearing member 12. The bearing liner is then coiled into a cylindrical shape and placed between the bearing members as shown in FIG. 1. The outer bearing member 12 and/or the inner bearing member 14 are then suitably deformed in the manner described above to bring the various bearing parts into interference fit relationship. The assembled bearing is then placed in a heating apparatus to bake the bearing assembly and, more particularly, the coating of resin applied to the bearing member to cure the resin. After the heating period has been completed, the resin will be cured and will form the bond between the liner and the inner surface 18 of the bearing member 12. The bearing assembly is then loosened in the manner previously described.

The bond between the bearing liner 16 and the inner surface 18 of the bearing member 12 is improved by coating the backing surface 28 of the bearing liner 16 with liquid resin subsequently dried to a tack-free B-stage before placing the bearing liner 16 between the bearing members 12 and 14.

Different processes are used to make the bush and bushings shown in FIGS. 11–14.

In forming the bushing, initially a bushing member 116 with an inner cylindrical surface 118 is formed. A bushing liner 120 with a low friction surface 122 is formed and includes adhesive resin dried to a tack-free B-stage. A parting compound is applied to the outer cylindrical surface of a mandrel. The parting compound prevents the resin in the liner 120 from bonding to the mandrel. Thereafter, the liner 120 is placed between the inner surface 118 of the bushing member 116 and the outer surface of the mandrel. The bushing member 116 is suitably deformed to bring the bushing member 116, the liner 120 and the mandrel into an interference fit relationship. The deforming processes mentioned above are adequate in this application. The assembly is then placed in a suitable heating apparatus to bake the liner to cure the resin. After this heating process has been completed, the resin will be cured and will form the bond between the liner and the inner surface 118 of the bushing 116. The parting compound which was applied to the mandrel will prevent the resin from bonding to the mandrel thereby allowing the mandrel to be withdrawn from the completed bushing.

The method for making the bushes shown in FIGS. 13 and 14 is similar to the method for making the bushings shown in FIGS. 11-12. The inner cylindrical surface of an arbor is coated with parting compound. The bush overlay 128 is positioned between the inner surface of the arbor and the outer surface 126 of the bush 124. The bush 124 is then deformed to form an interference fit between the bush 124, the overlay 128 and the arbor. The assembly is then baked to cure the resin in the overlay 128 and bond the overlay to the outer surface 126 of the bush 124. The completed lined bush is then withdrawn from the arbor.

Any of the various liners shown in FIGS. 3-8 can be used as bushing liners and bush overlays.

While the invention has been described with reference to a specific embodiment, the exact nature and scope of the invention is defined in the following claims.

What is claimed is:

1. A method of making bearings having low-friction surfaces comprising
    forming outer bearing members with inner bearing surfaces and inner bearing members with outer bearing surfaces,
    forming bearing liners with low-friction surfaces including adhesive resin dried to a tack-free B-stage,
    coating the bearing surfaces of one of the bearing members with parting compound,
    placing the bearing liners between the bearing surfaces of the bearing members,
    assembling the bearings,
    swaging the assembled bearings to provide an interference fit between the bearing liners and the bearing members,
    applying resin curing heat to the assembled bearings,
    curing the resin to thereby bond the bearing liners to the bearing members to which the parting compound was not applied, the parting compound inhibiting a bond between the bearing liners and the bearing members to which the parting compound is applied.

2. The method set forth in claim 1 further comprising impacting the assembled bearings to provide clearance between the bonded bearing liners and the bearing members to which the parting compound is applied.

3. The method set forth in claim 1 further comprising rolling the assembled bearings under pressure to provide clearance between the bonded bearing liners and the bearing members to which the parting compound is applied.

4. The method set forth in claim 1 comprising impacting and pressure rolling the assembled bearings to provide clearance between the bonded bearing liners and the bearing members to which the parting compound is applied.

5. The method set forth in claim 1 further comprising coating the bearing surfaces of the other of the bearing members with liquid adhesive resin before placing the bearing liners between the bearing surfaces of the bearing members,
    drying the liquid adhesive resin to a tack-free B-stage before placing the bearing liners between the bearing surfaces of the bearing members.

6. The method set forth in claim 1 further comprising cleaning the bearing surfaces of the other of the bearing members to render the bearing surfaces chemically clean before placing the bearing liners between the bearing surfaces of the bearing members.

7. The method set forth in claim 6 further comprising coating the bearing surfaces of the other of the bearing members with liquid adhesive resin after the bearing surfaces are cleaned,
    drying the liquid adhesive resin to a tack-free B-stage before placing the bearing liners between the bearing surfaces of the bearing members.

8. The method set forth in claim 7 wherein the bearing surfaces of the other of the bearing members are coated immediately after the bearing surfaces are cleaned.

9. The method set forth in claim 7 wherein the bearing surfaces of the other of bearing members are coated with adhesive resin identical to the adhesive resin included in the bearing liners.

10. The method set forth in claim 6 wherein the process of cleaning the bearing surfaces comprises
    sandblasting the bearing surfaces,
    washing the bearing surfaces,
    rinsing the bearing surfaces, and
    drying the bearing surfaces.

11. The method set forth in claim 6 wherein the process of cleaning the bearing surfaces comprises
    pickling the bearing surfaces,
    washing the bearing surfaces,
    rinsing the bearing surfaces, and
    drying the bearing surfaces.

12. The method set forth in claim 1 wherein the process of forming bearing liners with low-friction surfaces comprises
    applying liquid adhesive resin to sheets of felted fibrous material,
    impregnating the material with the resin
    drying the resin to a tack-free B-stage to form flexible sheetings having low friction surfaces.

13. The method set forth in claim 1 wherein the process of forming the bearing liners comprises
    forming flexible sheetings having low-friction surfaces,
    cutting the flexible sheetings to dimensions compatible with the dimensions of the bearing surfaces of the bearing members,
    coiling the sheetings into cylindrical shapes having dimensions compatible with the dimensions of the bearing surfaces of the bearing members.

14. The method set forth in claim 1 wherein the bearing liners comprise
    felted fibers in combination with dry resin having no surface bonding to the felted fibers, wherein the intertangled relationship of the felted fibers within the resin mechanically entraps the felted fibers in the resin.

15. The method set forth in claim 1 wherein the inner and outer bearing members are formed of metallic material.

16. The method set forth in claim 1 wherein the outer bearing members comprise cylindrical bearing members having concave inner bearing surface, and
    the inner bearing members comprise spherical bearing members having convex outer bearing surfaces that are complimentary to the concave inner bearing surfaces of the outer bearing members.

17. The method set forth in claim 16 wherein the inner and outer bearing members are formed of metallic material.

18. The method set forth in claim 1 wherein the outer bearing surfaces of the inner bearing members are coated with the parting compound.

19. The method set forth in claim 18 wherein
the inner bearing members comprise spherical bearing members having convex outer bearing surfaces.

20. The method set forth in claim 1 wherein
the inner bearing surfaces of the outer bearing members are coated with the parting compound.

21. The method set forth in claim 20 wherein
the outer bearing members comprise cylindrical bearing members having concave inner bearing surfaces.

22. A method of making bearings having low-friction surfaces comprising
forming outer bearing members with inner bearing surfaces and inner bearing members with outer bearing surfaces,
forming bearing liners with low-friction surfaces including cured adhesive resin,
coating the bearing surfaces of one of the bearing members with liquid adhesive resin,
drying the liquid adhesive resin to a tack-free B-stage,
placing the bearing liners between the bearing surfaces of the bearing members,
assembling the bearings,
swaging the assembled bearings to provide an interference fit between the bearing liners and the bearing members,
applying resin curing heat to the assembled bearings,
curing the resin to thereby bond the bearing liners to the bearing members to which the liquid adhesive resin was applied.

23. The method set forth in claim 20 wherein
the inner bearing surfaces of the outer bearing members are coated with the liquid adhesive resin.

24. The method set forth in claim 22 further comprising
coating one of the surfaces of the bearing liners with liquid adhesive resin before placing the bearing liners between the bearing surfaces of the bearing members,
drying the liquid adhesive resin to a tack-free B-stage before placing the bearing liners between the bearing surfaces of the bearing members, the coated surfaces of the bearing liners and the bearing members juxtaposed.

25. A method of making bushings having low-friction surfaces comprising
forming bushing members with inner cylindrical bushing surfaces,
forming bushing liners with low-friction surfaces including adhesive resin dried to a tack-free B-stage
coating outer cylindrical surfaces of mandrels with parting compound,
placing the bushing liners between the bushing surfaces of the bushing members and the outer cylindrical surfaces of the mandrels,
inserting the mandrels in the bushing members,
swagging the bushing members with the mandrels inserted therein to provide an interference fit between the bushing liners and the mandrels and bushing members,
applying resin curing heat to the bushing liners,
curing the resin to thereby bond the bushing liners to the bushing members, the parting compound inhibiting a bond between the bushing liners and the mandrels.

26. A method of making bushes having low-friction surfaces comprising
forming bush members with outer cylindrical surfaces,
forming bush overlays with low-friction surfaces including adhesive resin dried to a tack-free B-stage,
coating inner cylindrical surfaces of arbors with parting compound,
placing the bush overlays between the bush surfaces of the bush members and the inner cylindrical surfaces of the arbors,
inserting the bush members in the arbors,
pressing the bush members in the arbors to provide an interference fit between the bush overlays and the arbors and bush members,
applying resin curing heat to the bush overlays,
curing the resin to thereby bond the bush overlays to the bush members, the parting compound inhibiting a bond between the bush overlays and the arbors.

27. The method set forth in claim 1 wherein
the process of curing the resin contracts the bearing liner to thereby provide clearance between the bonded bearing liners and the bearing members to which the parting compound is applied.

* * * * *